Dec. 15, 1942.   A. C. PIXTON   2,305,557
FRUIT WEIGHING APPARATUS
Filed May 5, 1941   2 Sheets-Sheet 2
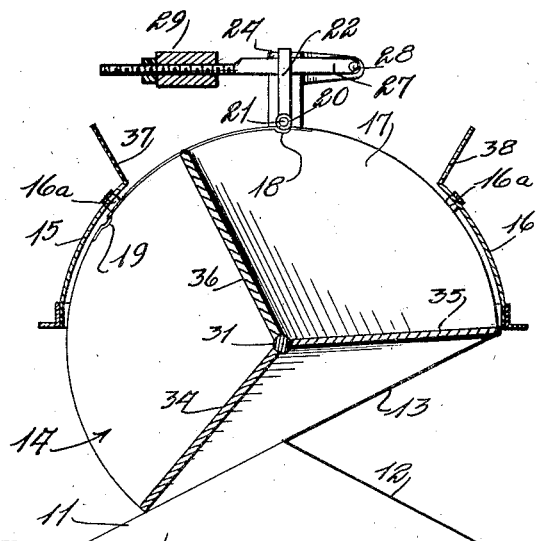
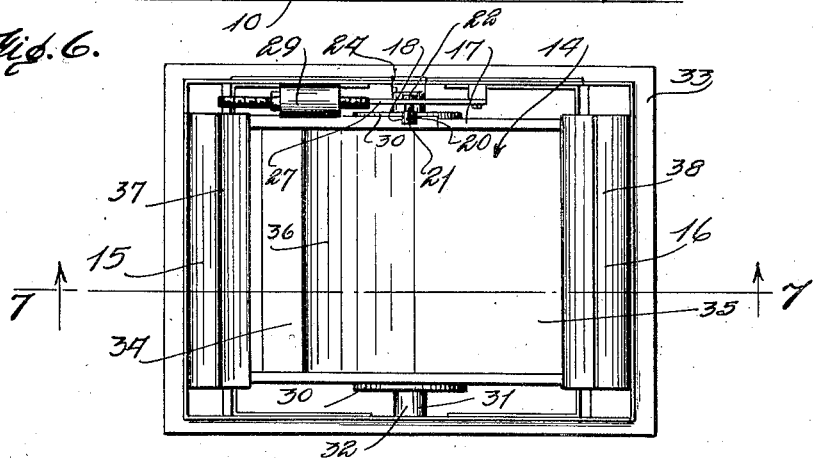
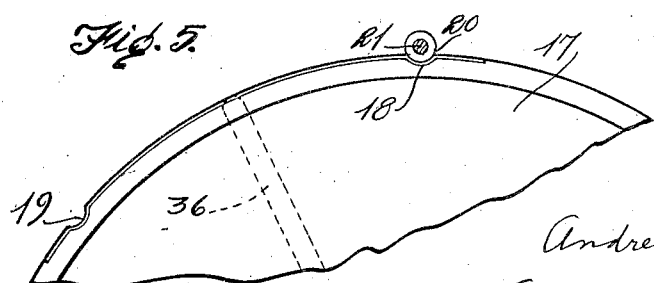
Inventor,
Andrew C. Pixton,
By Frank A. Appleman,
Attorney Patented Dec. 15, 1942

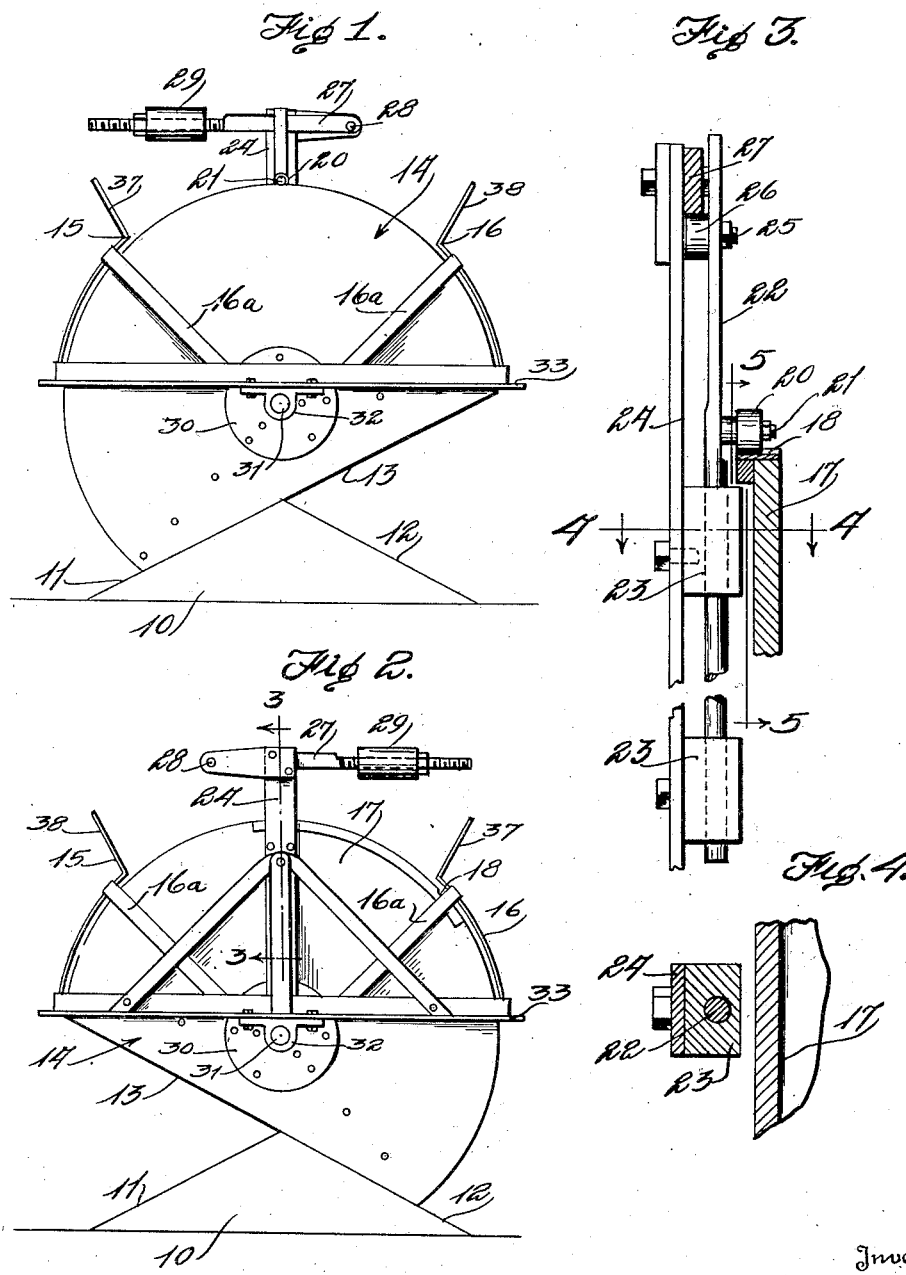

2,305,557

UNITED STATES PATENT OFFICE 2,305,557

FRUIT WEIGHING APPARATUS

Andrew C. Pixton, Placentia, Calif.

Application May 5, 1941, Serial No. 391,969

3 Claims. (Cl. 249—33)

This invention relates to weighing apparatus and particularly to an automatically operated and controlled instrumentality whereby a receptacle or chamber is oscillatably mounted for movement under the influence of the material or the weight of the material delivered to a sectional chamber; and it is an object of the invention to provide novel means whereby the weight by which the receptacle is moved may be controlled and registered, if desired, so that upon each of a series of operations, the weight of the contents of the chamber may be determined.

It is an object of this invention furthermore to provide a suitable base having oppositely inclined surfaces to be engaged by a portion of the chamber for limiting the oscillatory movement of the said chamber in order that the contents of the compartments of the chamber will be discharged alternately during the operation of the weighing apparatus.

It is a further object of the invention to provide means by which the movement of the chamber is communicated to the weighing instrumentality and to provide means for resetting the weighing instrumentality in association with different parts of the chamber.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in side elevation of a weighing apparatus embodying the invention;

Figure 2 illustrates a view in elevation of the said apparatus on the side opposite that shown in Fig. 1;

Figure 3 illustrates an enlarged sectional view at the edge of the standard and thrust rod;

Figure 4 illustrates a sectional view of the apparatus on the line 4—4 of Fig. 3;

Figure 5 illustrates a sectional view on the line 5—5 of Fig. 3;

Figure 6 illustrates a top plan view of the weighing apparatus; and

Figure 7 illustrates a sectional view on the line 7—7 of Fig. 6.

In these these drawings 10 denotes a base having oppositely inclined surfaces 11 and 12 which are engaged by the edge of a flange or apron 13, one on each side of the divided oscillating chamber 14. The periphery of the chamber is partially enclosed by segmental plates 15 and 16 attached in any appropriate manner to the frame and to braces 16a. The periphery of the side wall 17 is provided with recesses or seats 18 and 19, which alternately receive a roller 20 mounted on a stud 21, and the said stud is attached in any appropriate manner to a thrust rod 22, and the said thrust rod is appropriately guided in blocks, such as 23, stationed on a frame member or standard 24 forming a part of the weighing apparatus. The thrust rod 22 has a stud or bolt 25 extending through it and a roller 26 is rotatable on the said stud. A scale beam 27 is oscillatable on a pivot 28 and the said scale beam rests on the roller 26 and is moved upwardly as the thrust rod ascends, it being understood that when the chamber is partially rotated on its pivot, it will lift the thrust rod and thus communicate motion to the scale beam 27 which has an adjustable weight 29 threaded on it so that it may be adjusted to increase or diminish the required weight which will cause an operation of the weighing apparatus.

The sides of the chamber have cheek pieces or plates 30 with trunnions such as 31 that are partially rotatable in bearings such as 32 mounted on a frame 33 of the weighing apparatus, the said frame being suitably supported with relation to the base 10.

As shown in Fig. 7, the chamber has oppositely inclined floors 34 and 35 and a partition 36 dividing the chamber into two compartments, and the relation of this partition to the floors of the chamber is such that when one compartment is in position to be charged or filled with fruit or the material to be weighed, the other compartment is in the discharging position. It will be seen that the plates 15 and 16 have outwardly extending aprons 37 and 38, respectively, which serve to guide the fruit or material to be weighed to the appropriate compartment which is to be filled and, as the material in the discharging compartment is emptied, the weight of the contents in the compartment being filled will overcome the gravity of the weight 29 and the chamber will start to oscillate and the roller 20 will be cammed or forced out of the seat 18, and the chamber will continue to move under the influence of the weight in the compartment until its floor 35 is on the inclined surface 12 of the base 10. The said compartment will then be in discharging position so that its contents may escape, at which time the other compartment has moved in order that the roller 20 is in the seat 19 and the compartment under the seat 19 will be in position to be filled, so that there will be a sequence of operation according as the material to be weighed or the fruit is delivered to the compartments successively.

I claim:

1. In a fruit weighing apparatus, a chamber, means for oscillatively mounting the chamber, the said chamber having oppositely inclined floor sections and a partition dividing the interior of the chamber into equal compartments, segmental guard plates suitably secured to a stationary part of the apparatus to partially enclose the peripheries of the compartments so that material delivered to the compartments is held in place until the chamber is operated to discharge material, peripheral seats on the edge of the chamber, a thrust rod having a roller for alternately engaging the seats, the said roller being displaceable from the seats by the movement of the chamber, and a scale beam actuated by the thrust rod and lifted by the movement of the thrust rod as the chamber partially rotates.

2. In a fruit weighing apparatus, a chamber, means for oscillatively mounting the chamber, the said chamber having oppositely inclined floor sections and a partition dividing the interior of the chamber into equal compartments, segmental guard plates suitably secured to a stationary part of the apparatus to partially enclose the peripheries of the compartments so that material delivered to the compartments is held in place until the chamber is operated to discharge material, peripheral seats on the edge of the chamber, a thrust rod having a roller for alternately engaging the seats, the said roller being displaceable from the seats by the movement of the chamber, a scale beam actuated by the thrust rod and lifted by the movement of the thrust rod as the drum partially rotates, a base under the chamber having oppositely inclined surfaces, and an apron forming a part of the chamber adapted to alternately engage the inclined surfaces of the base to limit the movement of the chamber.

3. In a fruit weighing apparatus, a chamber having oppositely disposed floors extending from the central portion thereof to the periphery, a partition in the chamber extending from the inner junction of the floors to the periphery of the chamber dividing the chamber into compartments, enclosing plates for the periphery of the chamber on opposite sides thereof partially closing said compartments, said plates being mounted on a stationary part of the apparatus and having guiding flanges for directing the material to the compartments of the chamber, a thrust rod suitably guided at the side of the chamber, a roller mounted on the thrust rod, seats in the periphery of the chamber alternately engaged by the said roller, a scale beam suitably mounted in operative relation to the chamber, means on the thrust rod for engaging the scale beam and moving it upwardly when the roller is moved from the seats of the chamber, the said scale beam being weighted to cause the roller to enter the seats when the chamber is in a filling position, a base under the chamber, and means on the chamber and the base coacting therewith for limiting its oscillatory movement.

ANDREW C. PIXTON.